United States Patent [19]
Beagle

[11] Patent Number: 5,137,309
[45] Date of Patent: Aug. 11, 1992

[54] HOSE COUPLING INSERT

[75] Inventor: Leo F. Beagle, Payne, Ohio

[73] Assignee: Dana Corporation, Toledo, Ohio

[21] Appl. No.: 721,062

[22] Filed: Jun. 26, 1991

[51] Int. Cl.⁵ .................................... F16L 33/00
[52] U.S. Cl. ........................... 285/256; 285/259
[58] Field of Search ................ 285/149, 256, 259

[56] References Cited

U.S. PATENT DOCUMENTS

| | | | |
|---|---|---|---|
| 2,211,446 | 8/1942 | Troshkin | 285/149 X |
| 2,374,226 | 4/1945 | Melson | 285/84 |
| 2,410,600 | 11/1946 | Cowles | 285/84 |
| 2,805,088 | 9/1957 | Cline et al. | 285/239 |
| 3,185,500 | 5/1965 | Luther | 285/256 X |
| 3,210,100 | 10/1965 | Lowles et al. | 285/259 X |
| 3,243,208 | 3/1966 | Lalikos et al. | |
| 3,252,720 | 5/1966 | Waite | 285/256 |
| 3,345,090 | 10/1967 | Weatherhead, Jr. et al. | 285/256 |
| 3,526,426 | 9/1970 | Wessells | |
| 3,656,692 | 9/1972 | Henson | 285/242 |
| 4,114,656 | 9/1978 | Kish | 138/109 |
| 4,142,554 | 3/1979 | Washkewicz et al. | 285/149 X |
| 4,226,446 | 10/1980 | Burrington | 285/256 |
| 4,369,992 | 1/1983 | Fournier et al. | 285/256 |
| 4,522,435 | 6/1985 | Miller et al. | 285/256 |
| 4,564,223 | 1/1986 | Burrington | 285/256 |
| 4,684,157 | 8/1987 | Smith | 285/256 |
| 4,754,944 | 7/1988 | Melzer et al. | 285/259 |

Primary Examiner—Michael F. Trettel
Attorney, Agent, or Firm—F. B. McDonald

[57] ABSTRACT

A metallic hose coupling assembly provides an improved coupling insert for flexible elastomeric hose. The insert contains a series of external barbs defined by repeating asymmetrical axially inversely oriented pairs of frustoconical segments spaced apart by and contiguous with cylindrical segments positioned therebetween. Each mated pair of frustoconical segments interfaces with a cylindrical segment in a manner which defines rounded interface edges having radii which fall within a range of 15 to 25 thousandths of an inch. The latter configuration of barb provides an effective means of preventing fracture of elastomer hose ends when subjected to relatively high pressure hydraulic applications.

11 Claims, 1 Drawing Sheet

HOSE COUPLING INSERT

BACKGROUND OF THE INVENTION

This invention relates to hose coupling inserts of the type utilizing crimped sleeve and nipple insert assemblies for use on flexible hose ends. More particularly, the invention relates to the construction of nipple inserts utilized in such assemblies, particularly for use with elastomeric hose materials.

In the prior art, it has been commonplace to employ nipple inserts containing barbs designed to grip the "innertubing" of hose ends for purposes of coupling such ends to relatively movable hydraulic apparatus, such as that employed in back hoe and front end loaders. Such nipple inserts are first inserted into hose ends, and sleeves are mounted thereover, whereupon the sleeves are crimped circumferentially about the hose ends for assuring permanent coupling of the hose ends to the nipple inserts. The barbs elastically, and in some cases plastically, distort and displace selective portions of the innertubing. A balance must, however, be achieved in the coupling mechanism involved. The barbs must be designed in a manner to adequately secure the hose to the insert; yet, stress tears, which can propagate and result in fracture of the hose, must be assiduously avoided.

Several designs have employed barbs which include axially directed tips adapted to make a "controlled" cut into the hose liner, thus avoiding undesirable tearing and resultant fracture of the rubber. One of such designs even provides a controlled leakage path in an environment utilizing a plurality of such tips, wherein a labyrinth-style mechanism is effective to avoid leakage as a function of system pressure. Such designs however are relatively complex, and unless sized properly can cause more problems than they are designed to solve. More preferable is a design which avoids high stress areas altogether. Such designs are predicated on the premise that if high stress areas are avoided, such stress areas will not propagate, and premature fractures, hence failures, can be more effectively avoided.

SUMMARY OF THE INVENTION

The hose coupling insert disclosed herein provides a system of "barbs" adapted for coupling flexible elastomeric or "rubber" hose ends without overstressing localized areas of the innertube or lining of the ends employed therewith. In a preferred form, the hose coupling assembly includes an insert member which defines an axis and has a generally external cylindrical surface adapted to engage an inner bore of the hose end about the axis. A sleeve member is adapted to coaxially engage the outer surface of the hose end. The insert contains a repeating series of the barbs, defined by asymmetrical, axially opposed, pairs of frustoconical segments. Each of such pair of segments are spaced apart by and are contiguous with one intermediately positioned cylindrical segment.

Each mating pair of frustoconical segments defines barb ramp angles of 60 degrees and 7 degrees, respectively; the steeper, 60 degree, angles are retention angles, the shallower 7 degree angles are called "assembly or fitting" angles. The retention angles are designed for retaining or holding the hose end onto the nipple insert once the sleeve has been crimped about the hose end after the nipple insert is in place. The assembly angle, on the other hand, represents an angle which facilitates insertion of the nipple insert into the innerlining of the hose end. In the preferred form the sleeve also contains barbs, the latter being, however, located internally, and disposed along the axial length, of the sleeve adjacent the free end of the nipple insert.

For avoiding localized stress, this invention contemplates that the contiguous cylindrical and frustoconical segments of the nipple insert barbs will interface at rounded contours defined by radiuses or "radii" having a dimensional range of 15 to 25 thousands of an inch. In addition, the cylindrical portion of any given barb of the nipple insert will comprise 20 to 30% of the overall axial length of the barb.

DETAILED DESCRIPTION OF A PREFERRED EMBODIMENT

Figure 1:
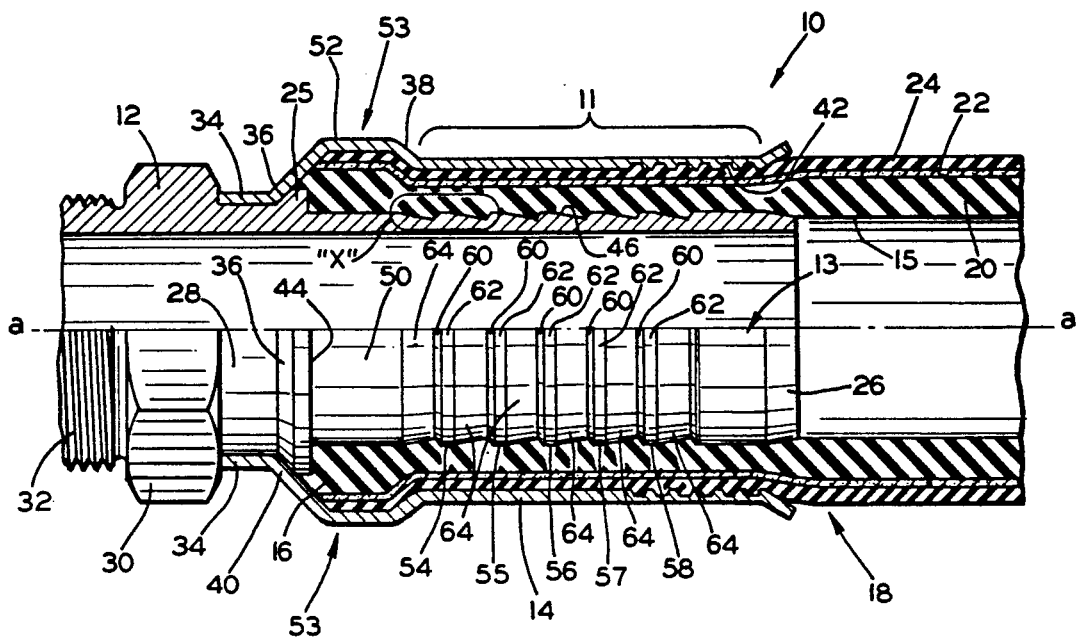
FIG. 1 a cross-sectional view of a metallic coupling assembly constructed in accordance with the present invention.

Referring initially to FIG. 1, a hose coupling assembly 10 incorporates a nipple insert 12 having a nipple 13 in resilient, yet vigorously gripping, engagement with the internal diameter 15 of a hose end 18. The hose end 18 is comprised of an innertube 20 in direct engagement with the nipple 13, a braid 22 circumferentially overlying the innertube 20, and an outer hose shell or covering 24 which overlies the braid 22. The hose coupling assembly 10 further includes an annular sleeve member 14 crimped about the outer hose covering 24 as shown. Those skilled in the art will appreciate the use of a hose insert stop ring 25 as an integrally formed part of the nipple insert 12. The stop ring 25 contains a radial surface 44 which operates to limit the amount of insertion of the hose end 18 between the nipple 13 and the overlying sleeve member 14 during assembly. After crimping, the extremity 16 of the hose end remains uncrimped and defines a stress relief zone, or a place into which elastomeric material crimped between the sleeve 14 and nipple 13 may flow. Without a stress relief zone 16, the hose coupling assembly may not be effectively crimped.

The nipple 13 has a free end 26 which represents that portion of the insert 12 which is initially inserted into the hose end 18. Opposite the free end 26 is a coupling or attachment portion 28 of the nipple 13. The latter may be integrally formed with a hex head 30 as shown herein, or alternatively may be formed with or installed to some other type of fitting suitable for a particular hydraulic application. In the embodiment shown, the hex head 30 is directly and integrally fixed to an externally threaded coupling member 32.

It will be appreciated by those skilled in the art that the coupling portion 28 of the nipple 13 provides a necked or grooved area adapted for receiving an anchor portion 34 of the sleeve 14. Adjacent the coupling portion 28 is a ramped or angled portion 36 of the hose stop ring 25. In the preferred form, the ramped portion 36 forms the rear surface of the ring 25, while the radial surface 44 forms the front surface thereof. Corresponding front and rear references will be utilized hereinafter. For example, the free end 26 of the nipple 13 will be referred to as the front end of the nipple.

Overlying the ramped portion 36 of the stop ring 25 is a corresponding rear ramped portion 40 of the sleeve 14. Contiguous with the ramped portion 40 is a cylindrical portion 52 of the sleeve 14. Analogous to the corresponding ramped portion 40 of the sleeve 14 is a front inversely ramped portion 38 which adjoins the cylindrical portion 52 of the sleeve. Together the portions 40, 52, and 38 form a bulbous sleeve section 53 which overlies the above-referenced stress relief zone 16 of the hose end 18. The section 53 is contiguous with the front elongated cylindrical region 11 of the sleeve, which is, in turn, crimped to the hose end 18. Those skilled in the art will appreciate that a substantial portion of the region 11 has a series of internal U-shaped barbs overlying the front or free end 26 of the nipple 13 for providing even more effective crimping of the hose end 18 therebetween.

Figure 2:
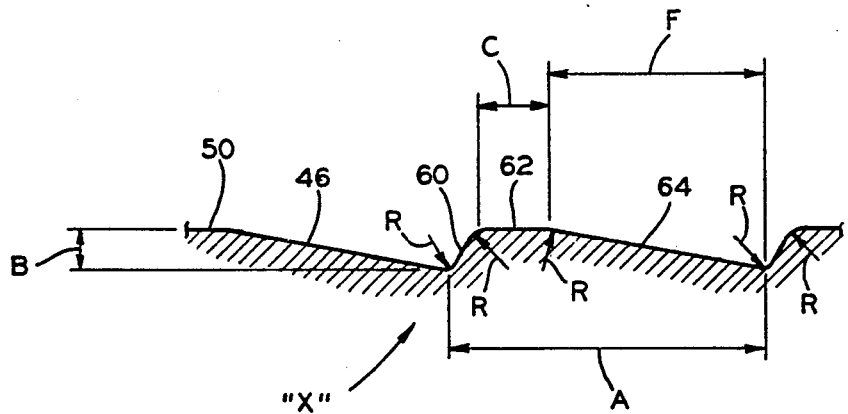
FIG. 2 view of a repeating "barb" profile taken from the encircled of FIG. 1.

FIG. 2, depicts an enlargement of the encircled area "X" of FIG. 1 in greater detail. The encircled area "X" shows the profile of a series of barbs situated on the outside diameter 46 of the insert 13. The barbs are particularly identified in the lower half-view of the insert 13 as (from rear to front) 54, 55, 56, 57, and 58. A greater or lesser number of barbs may be employed, depending on the specific application. Referring now particularly to FIG. 2, each barb has a repeating series of segments from rear to front; a steeply angled retention segment 60, a cylindrical relief segment 62, and an inversely oriented shallow angled "fitting or assembly" segment 64. In the preferred form, each of the various segments 60, 62, 64 is parallel to its own counterpart from barb to barb; more particularly, all segments 60 are parallel to each other and all segments 64 are parallel to one another.

As more clearly depicted in FIG. 2, the segments 60 operate to "retain" the hose end 18 against axial forces which tend to pull the hose end from the insert. On the other hand, the "fitting" segments 64 operate to facilitate "assembly" or insertion of the nipple insert 12 into the hose end 18. Hence, each retention segment 60 has a relatively steep angle as measured with respect to the axis "a—a" (FIG. 1). In the preferred embodiment as depicted, the retention segment 60 has a frustoconically shaped body with a preferred angle of 60 degrees. A preferred range of the acute angle of each retention segment 60 is between 45 and 75 degrees as measured with respect to the axis "a—a". The fitting or assembly segment 64 also defines a frustoconical shaped body, but employs a very shallow angle; in the preferred form the latter is approximately 7 degrees as measured with respect to axis "a—a". A preferred range of the smaller angle of the fitting segment 64 is 4 to 9 degrees as measured with respect to the axis "a—a". Each relief segment 62 is contiguously positioned with, and intermediately of, each paired set of inversely oriented segments 60 and 64 as shown in FIG. 2. Each relief segment 62 defines a cylindrical body and has a length "C" as shown. The axial length of each fitting segment 64 is shown as "F", while the overall length of each of the repeating barbs 54, 55, 56, 57, 58 is depicted as "A". In the preferred example shown, "A" equals 0.200 inch, "C" equals 0.050, and "F" equals 0.140 inch. The nipple insert has a nominal internal diameter of one inch.

An additional feature of the present invention is the use of rounded interfaces having radii "R" as shown in FIG. 2 between contiguous cylindrical and frustoconical segments. The radii of the interfaces comprise a range of 15 to 25 thousandths of an inch in a barb having a height "B" of approximately 0.030 inch. In the preferred form, the radii "R" would preferably fall within a range of approximately 50 to 80 percent of the overall height of each barb.

In the above-described example, the axial lengths "C" and "F" are measured from mid-points of the radii "R". Thus the stated length "C" equals 0.050 inch when measured from radius to radius. It should be pointed out, however, that the use of radii "R" in the range of 15 to 25 thousandths of an inch will actually reduce the length of the "true" cylindrical portion of the segments 62 to between 0.035 and 0.040 inch.

A final feature of the present invention is that each elongated cylindrical relief segment 62, which extends the length "C" between each paired retention and fitting segment 60 and 64, comprises 20 to 30 percent of the overall axial length of each barb. The result is that elastomeric fracturing is virtually eliminated via segments 62 which operate to reduce otherwise localized stresses at each barb. Such stresses propagate through the hose and give rise to the fractures which lead to early failure. The assembly 10 has been found to be effective under cyclic working pressures as high as 4000 pounds per square inch.

Although only one embodiment has been detailed and described herein, the following claims will cover numerous additional embodiments which fall within the spirit and scope thereof.

What is claimed is:

1. In a metallic hose end assembly adapted for coupling flexible elastomeric hose, said assembly including an insert member having an axis and a generally external cylindrical surface adapted to engage an inner bore of said hose about said axis, and a sleeve member adapted to co-axially engage the outer end surface of said hose; an improvement in said cylindrical surface of said insert comprising a series of barbs each defined by asymmetrical, axially inversely oriented pairs of frustoconical segments spaced apart by, and contiguous with, cylindrical segments positioned therebetween.

2. The insert of claim 1 wherein one of each of said pairs of frustoconical segments is oriented at a first angle, the other of each of said pairs is oriented at a second angle; wherein said first and second angles are unequal, and wherein said angles are both acute as measured with respect to said axis.

3. The insert of claim 2 wherein said first angle has a value within a range of 45 to 75 degrees as measured with respect to said axis, and said second angle has a value within a range of 4–9 degrees with respect to said axis.

4. The insert of claim 3 wherein said first angle of said frustoconical segments is adapted for retention of said hose on said insert against axial tensile forces; said second angle of said frustoconical segments is adapted to facilitate assembly of said hose onto said insert.

5. The insert of claim 4 wherein said first angle is oriented in a first direction and wherein said second angle is oriented in an opposite direction, wherein all first angles of all barbs are parallel to each other, and all second angles are parallel to one another along said insert.

6. The insert of claim 1 wherein said cylindrical portion of each barb comprises 20–30 percent of the overall axial length of each barb.

7. The insert of claim 6 wherein said sleeve member comprises an annular array of symmetrical internal barbs disposed along a portion of the axial length thereof, said barbs positioned radially outwardly of but extending radially inwardly toward said barbs of said insert.

8. The insert of claim 7 further comprising an interface between each said cylindrical segment and contiguous frustoconical segment, each interface defining a radius having a range of 15 to 25 thousandths of an inch.

9. The insert of claim 8 wherein said radii between said cylindrical and frustoconical segments comprise 50-80 percent of the overall height of a given barb.

10. The insert of claim 9 wherein one of each of said pairs of frustoconical segments is oriented at a first angle, other of each of said pairs is oriented at a second angle; and wherein said first angle equals approximately 60 degrees and said second angle equals approximately 7 degrees as measured with respect to said axis.

11. The insert of claim 10 wherein said elastomeric hose comprises a braided reinforcement therethrough.

* * * * *